106. COMPOSITIONS,
90 COATING OR PLASTIC.

Patented Dec. 17, 1940

Examiner 2,225,147

UNITED STATES PATENT OFFICE 2,225,147

PORTLAND CEMENT MANUFACTURE

Ira C. Bechtold, Colton, Calif., assignor to California Portland Cement Company, Los Angeles, Calif., a corporation of California No Drawing. Application March 18, 1938, Serial No. 196,699

10 Claims. (Cl. 106—27)

This invention relates to improved Portland cements and methods for their manufacture involving the use of certain types of materials ("grinding aids") which when added to the cement clinker greatly facilitate its grinding to high degrees of fineness, and improve the finished cement in a number of important respects. My primary object is to enable Portland cement clinker to be ground to high fineness at abnormally low power consumption and reduced general cost, and to provide a finished cement which, because of its fineness and the presence of the grinding aid, possesses superior plasticity and other desirable properties. It is to be understood that the invention is applicable to the manufacture of Portland cements in general, and which may or may not contain added materials beside the substance used as a grinding aid. The latter has the same general effect on the grindability of various Portland cement clinkers and clinker mixtures. In any specific instance, however, a particular clinker or clinker mixture composition may be selected which together with the substance used as a grinding aid, will give certain particularly desired properties to the finished cement.

In the commercial grinding of Portland cement clinker to produce the finished cement, the energy required to grind the clinker increases as the fineness of grinding increases, and becomes excessively disproportionate as the clinker is reduced to extreme fineness. Present day tendencies are toward Portland cements of high finenesses, and as a result the grinding costs are increasing greatly. The requirement of excessive energy for grinding the cement to high finenesses is due to the fact that the finer particles build up coatings on the grinding media and walls of the mill, and increasingly so as the fineness of grinding increases. As a result, these fine particle coatings cushion and prevent free and direct interaction of the grinding surfaces, so that much of the energy being expended in the mill is wasted, being converted to heat generated within the cushioning layers. The mill consequently loses grinding efficiency and frequently becomes seriously overheated.

In accordance with the invention, I overcome these common difficulties and tendencies by maintaining the particles of ground clinker in a dispersed condition such that coatings on the grinding surfaces within the mill are reduced or substantially eliminated. Thus I maintain direct and efficient action between the grinding media despite the presence of any proportion of extremely fine clinker particles. It has been known that certain substances added to the Portland cement clinker will to some extent cause the clinker particles to be dispersed and freed from the grinding media and surfaces of the mill during the grinding operation. In many instances the substances used for this purpose have had comparatively limited effectiveness as grinding aids, or have been objectionable in that they impart undesirable properties to the finished cement. For example, in some instances they alter the normal or desired color of the cement, adversely affect setting time and impair strength development, or cause excessive increases in volume change.

In accordance with the invention, I have found it possible to employ as grinding aids substances which permit the Portland cement clinker to be ground to extreme fineness at low cost, without interfering with the desired properties of the finished cement. As a matter of fact, certain of the properties of the cement are definitely improved. I have determined that the alcohol ethers, as a class, are efficient grinding aids, and that they have certain desirable effects upon the properties of the cement, particularly with respect to plasticity or workability and the maintenance of low expansion in the autoclave test. It will be understood that I may use for the purposes of the invention any suitable alcohol ether, or combination of selected alcohol ethers, the choice generally being dependent upon the composition of the particular clinker or clinker mixture and the particular alcohol ether or alcohol ether mixture that may be determined to give the desired or best results in the finished cement. For enhancing the plastic properties of cements as well as to aid in grinding, the compound diethylene glycol mono butyl ether is to be preferred. Also the alcohol ether admixture may be used in any proportions found to give best results, although ordinarily its percentage will not exceed 0.50% by weight of the cement, and preferably will be held within from 0.05 to 0.30%, since small percentages within that range have been found sufficient. The general and common effects of the alcohol ethers as grinding aids have been demonstrated by tests made on Portland cements interground with small percentages of a number of the ethylene glycol and diethylene glycol ethers.

The efficiency, as grinding aids, of individual members of a typical group of the alcohol ethers, as well as effects upon the properties of the finished cement, are illustrated by the data presented in the table below. Tests were made for the purpose of comparing the properties of a normal Portland cement control sample with samples of the same cement interground with different alcohol ethers in different proportions, and also to determine relative effects on the same clinker and cement of different alcohol ethers. These tests were made using a common stock of commercial Portland cement clinker stock crushed and pulverized until 100% passed an 8 mesh sieve, and all grinding experiments thus were performed on material of the same composition and initial particle size distribution. Individual samples of this crushed clinker stock, each consisting of 1816 grams thereof and 69 grams of gypsum, were prepared and small amounts of the various alcohol ethers added to the samples, except to the "control" sample, in percentages as indicated in the table. The individual samples were then subjected to two stage grinding in a steel jar mill 11½" in diameter and 10" long. The preliminary grinding consisted of 900 revolutions in the mill with a ball charge of 45 lbs. of steel balls 1¼" in diameter. The final grinding consisted of 1823 revolutions in the mill with a ball charge of 70 lbs. of steel balls ⅜ to ½" in diameter. While the substances used as grinding aids may be added to the clinker in any suitable manner, in the tests tabulated, measured quantities of the alcohol ethers in the percentages indicated, were introduced directly to the clinker in the mill.

After grinding, the several lots of cement were subjected to various physical tests to determine their properties. Fineness was determined by the Wagner turbidimeter using the method described in Proceedings of the American Society of Testing Materials, vol. 33, part II, page 553, 1933. An alternate determination was made by means of an air analyzer of the Pearson type to determine the proportion of particles smaller than 20 microns in diameter present in the ground cement. Water required for "normal consistency" was determined by the well known method. Setting time was determined by means of the Gilmore needle on standard pats. Strength tests were made by the A. S. T. M. method for tensile strength using a 1:3 Ottawa sand mortar. Data on soundness were secured by autoclaving 1 by 1 by 5 inch (gauge length) bars of neat cement paste at 420° F. and 300 lb. steam pressure for a period of 5 hours. This included a 1 hour period for raising the temperature of the autoclave and 1 hour for cooling. These bars were measured by means of a micrometer comparator before and after autoclaving.

From the tabulated results it is clearly indicated that all of the glycol ethers tested produced cements of substantially higher degrees of fineness than the control cement (sample A), with the expenditure of the same amount of grinding energy. In some instances the specific surfaces (square centimeters per gram) of the samples interground with glycol ethers, exceed that of the control sample by more than 200. It is to be understood that the particular range of specific surfaces set out in the table are typical only, and that the cements may be ground to much higher finenesses without the development of excessive heating and loss of grinding efficiency. Of course, if it is desired to grind the cement to lower finenesses, the grinding aids will have the effect of reducing the required amount of energy just as at high finenesses. Further with respect to fineness, the table shows that there is a general increase in the production of particles within the range of 20 microns and under in the admixture samples, as compared with the corresponding particle size range in the control sample.

| | Admixture | Percent | Fineness | | Percent net expansion in autoclave | Percent water for N. C. | Setting time | | | | Std. 1:3 tensile strength | | |
|---|---|---|---|---|---|---|---|---|---|---|---|---|---|
| | | | 0/0-20 microns | Specific surface | | | Initial | | Final | | 1D | 7D | 28D |
| | | | | | | | Hours | Minutes | Hours | Minutes | | | |
| A | Control | | 54.8 | 1953 | +0.490 | 23.5 | 2 | 46 | 5 | 15 | 153 | 391 | 441 |
| B | Ethylene glycol monomethyl ether | 0.100 | 59.0 | 2173 | +0.548 | 26.0 | 2 | 25 | 5 | 34 | 139 | 435 | 455 |
| C | do | 0.250 | 63.1 | 2186 | +0.634 | 27.4 | 2 | 20 | 5 | 29 | 144 | 385 | 396 |
| D | Ethylene glycol monoethyl ether | 0.100 | 60.6 | 2124 | +0.510 | 25.5 | 2 | 15 | 4 | 40 | 170 | 412 | 489 |
| E | do | 0.250 | 60.9 | 2149 | +0.560 | 26.5 | 2 | 10 | 5 | 19 | 168 | 371 | 445 |
| F | Ethylene glycol monobutyl ether | 0.100 | 65.1 | 2136 | +0.610 | 29.0 | 2 | 55 | 5 | 31 | 132 | 364 | 419 |
| G | do | 0.250 | 58.8 | 2133 | +0.596 | 27.0 | 2 | 30 | 5 | 26 | 120 | 379 | 456 |
| H | Diethylene glycol monomethyl ether | 0.100 | 63.2 | 2214 | +0.526 | 26.8 | 2 | 05 | 5 | 35 | 153 | 387 | 474 |
| I | do | 0.250 | 57.9 | 2179 | +0.498 | 25.5 | 2 | 23 | 5 | 30 | 169 | 374 | 459 |
| J | Diethylene glycol monoethyl ether | 0.100 | 60.5 | 2117 | +0.512 | 26.8 | 2 | 20 | 5 | 27 | 144 | 355 | 460 |
| K | do | 0.250 | 59.4 | 2226 | +0.434 | 25.5 | 2 | 15 | 5 | 09 | 183 | 380 | 459 |
| L | Diethylene glycol monobutyl ether | 0.100 | 63.3 | 2110 | +0.606 | 28.5 | 3 | 02 | 6 | 15 | 128 | 361 | 471 |
| M | do | 0.250 | 57.6 | 2149 | +0.560 | 26.0 | 2 | 42 | 6 | 28 | 166 | 360 | 425 |

The molecular formula for the admixtures disclosed above are as follows:

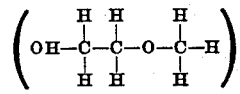

ethylene glycol monomethyl ether

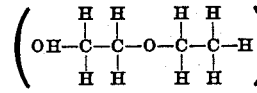

ethylene glycol monoethyl ether

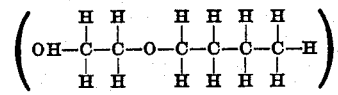

ethylene glycol monobutyl ether

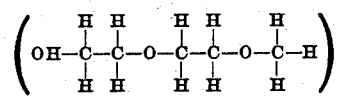

diethylene glycol monomethyl ether

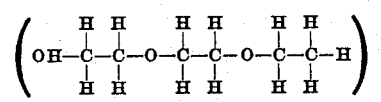

diethylene glycol monoethyl ether

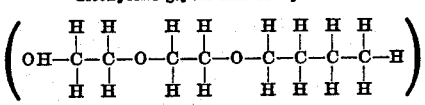

diethylene glycol monobutyl ether

One of the principal improvements in the properties of the cement resulting from intergrinding with the glycol ethers, is materially increased plasticity and workability. Practically and commercially this feature is of importance in that the finished product is rendered particularly suitable for use in plastic cement compositions. It may be observed that as compared with the control sample, the increased plasticity of the cements interground with the glycol ethers, while due in part to increased fineness, is also due to the presence of the glycol ether. This has been demonstrated by the fact that of two samples having the same fineness but only one of which contains the grinding aid, the latter will show markedly superior plastic properties.

Comparison with the properties of the control sample shows that the glycol ethers do not adversely affect the normal expansion of the cements containing them. Also the latter cements show favorable setting and strength properties as compared with the control sample. Thus it is indicated that in addition to the benefits of greater ease in grinding, not only are the desirable properties of the normal or control cement retained, but some of the properties, particularly plasticity, are improved.

In the past this subject has not been well-developed in the art as far as the fundamental aspects of the action of grinding aids are concerned. The basic principles of chemistry and physics which explain the mechanisms underlying the packing or caking of finely ground cements in the milling operation have not been thoroughly investigated nor adequately explained. Furthermore, an adequate explanation of the fundamental phenomena which are involved in the action of grinding aids has not been known. This is especially true of any knowledge which will apply to a wide variety of organic substances of extreme diversity of chemical and physical properties.

While this invention is not to be considered as restricted to any particular theory there are certain hypothetical explanations which are useful in considering its effects and results. It is thought that cement particles may be regarded as heterogeneous masses composed of several crystalline compounds embedded in a matrix of glasslike, undercooled melt. As these are reduced in size they may become less heterogeneous by virtue of approaching the size corresponding to that of the grains of the individual constituents. It may even be possible that in some cases the smallest particles consist of a single constituent. At this point the situation may be such as that believed to exist when a crystalline mass is reduced in size to the point where the crystal lattice is no longer complete. That is to say, the surface of the individual particle consists of partial unit cells and the particle as a whole does not have its atoms proportioned in an exact stoichiometrical ratio. Therefore, polar groups would be present in electrically unbalanced numbers on an individual particle. Two such particles with groups having their balance shifted to opposite electrical sign would be expected to be attracted and hence aggregations might develop and the particles would be packed or caked. Also, these polar surfaces could be expected to be attracted to metallic surfaces and hence would coat the mill and grinding media.

The action of a grinding aid is then explainable in the following manner. A substance which functions as a grinding aid is probably one which surrounds the particles of cement with a film or layer. This layer shields the surface groups of the particle and produces an external surface which is uniform over the entire particle and is also identical on all particles. Therefore, a cement treated with a grinding aid is composed of particles of like surface characteristics and they tend to repel each other or remain dispersed.

As a part of my copending application Serial No. 173,841 filed November 10, 1937, a theory of the action of grinding aids was advanced with particular reference to the glycols. It has been shown by Gallaugher and Hibbert (Journal of the American Chemical Society, vol. 59, Number 12, December, 1937, pages 2514 et seq.) that the surface energy characteristics of the glycols, at the surfaces of their own liquids, may be explained on a basis of the orientation of the glycol molecule in the form of an inverted U. That is to say, the terminal polar groups (—OH) are believed to orient themselves toward or in the liquid phase with the ethylene oxide groups toward the air. Thus the ethylene oxide groups may exist at the apex of the U or in the sides of the U. It is suggested that it is this latter group which controls the total surface energy.

The present application discloses the grinding aid properties of a group of compounds known as alcohol-ethers. The structure of these is such that a slightly polar group such as methoxyl, ethoxyl etc., is substituted for one of the terminal —OH groups which are strongly polar. Gallaugher and Hibbert have shown that such a substitution produces a reduction in total surface energy. Despite such reduction in total surface energy at the air-liquid interface it is seen that the alcohol-ethers function well as grinding aids. In accordance with the above-mentioned reference it is postulated by the applicant that the terminal polar groups are attracted toward the polar surface of the cement particle in the same position as they would have at the air-liquid interface of their own liquids. Probably the methoxyl, ethoxyl etc., terminal group is not as strongly held toward the particle. However, such orientation would set the remainder of the molecule toward the air phase and the ethylene oxide group or groups are in the apex or sides of the U where it may be the controlling factor as far as total surface energy is concerned. The particles are therefore filmed with a uniform layer of alcohol-ether molecules as soon as there are sufficient molecules so that the sum of their effective molecular areas is equivalent to the area of the particle surface. Thus it is believed that it is the first layer, or the "monomolecular layer," which is most effective in producing the grinding aid action and that the addition of other layers may not be of great significance. In fact, with some substances the addition of too many layers may vitiate the effect by having the surfaces of the particles assume the physical characteristics of the filming substance in bulk form rather than the characteristics of a monomolecular surface layer. Thus it is seen that the numerous cement particles have their peculiarly characteristic polar, surface groups shielded by like films and when they approach each other they present these like, non-polar surfaces toward each other and therefore there is a tendency toward mutual repulsion rather than attraction.

I claim:

1. The process that includes, grinding Portland cement clinker admixed with a small percentage of an alcohol ether to produce Portland cement in finely divided form.

2. The process that includes, grinding Portland cement clinker admixed with a small percentage of an ethylene glycol ether to produce Portland cement in finely divided form.

3. The process that includes, grinding Portland cement clinker admixed with a small percentage of a diethylene glycol ether to produce Portland cement in finely divided form.

4. The process that includes, grinding Portland cement clinker admixed with substantially 0.05% to 0.50% by weight of an alcohol ether to produce Portland cement in finely divided form.

5. The process that includes, grinding Portland cement clinker admixed with a small percentage of an alcohol ether to produce Portland cement having a specific surface in excess of substantially 2000.

6. Portland cement in dry finely divided form containing a small percentage of an alcohol ether uniformly distributed throughout the cement and coating the individual particles thereof.

7. Portland cement in dry finely divided form containing a small percentage of an ethylene glycol ether uniformly distributed throughout the cement and coating the individual particles thereof.

8. Portland cement in dry finely divided form containing a small percentage of a diethylene glycol ether uniformly distributed throughout the cement and coating the individual particles thereof.

9. Portland cement in dry finely divided form containing substantially 0.05% to 0.50% by weight of an alcohol ether uniformly distributed throughout the cement and coating the individual particles thereof.

10. Portland cement in dry finely divided form having a specific surface in excess of 2000 and containing a small percentage of an alcohol ether uniformly distributed throughout the cement and coating the individual particles thereof.

IRA C. BECHTOLD.